United States Patent [19]

Riley et al.

[11] Patent Number: 4,662,223
[45] Date of Patent: May 5, 1987

[54] METHOD AND MEANS FOR STEERING PHASED ARRAY SCANNER IN ULTRASOUND IMAGING SYSTEM

[75] Inventors: James K. Riley, Davis; Stockton M. Miller-Jones, Rancho Cordova, both of Calif.

[73] Assignee: General Electric Company, Rancho Cordova, Calif.

[21] Appl. No.: 794,093

[22] Filed: Oct. 31, 1985

[51] Int. Cl.⁴ ............................................. G01N 29/00
[52] U.S. Cl. ........................................ 73/626; 73/609; 367/103; 128/660
[58] Field of Search ............................ 367/59, 61, 103; 73/625, 626, 628, 609; 128/660

[56] References Cited

U.S. PATENT DOCUMENTS

| | | | |
|---|---|---|---|
| 4,140,022 | 2/1979 | Maslak | 73/626 |
| 4,154,113 | 5/1979 | Engeler | 73/626 |
| 4,155,228 | 5/1979 | Engeler et al. | 73/626 |
| 4,155,260 | 5/1979 | Engeler et al. | 73/626 |
| 4,180,791 | 12/1979 | Tiemann | 73/626 |
| 4,330,875 | 5/1982 | Tachita et al. | 73/626 |
| 4,387,597 | 6/1983 | Brandestini | 73/626 |
| 4,484,477 | 11/1984 | Buxton | 73/626 |
| 4,487,073 | 12/1984 | Sumino | 73/626 |
| 4,598,589 | 7/1986 | Riley et al. | 73/609 |

Primary Examiner—Howard A. Birmiel
Attorney, Agent, or Firm—Flehr, Hohbach, Test, Albritton & Herbert

[57] ABSTRACT

A phased array of transducer elements in an ultrasound imaging system is selectively directed by grouping transducer elements in the array to form a plurality of groups of adjacent transducer elements. Electrical signals in each group are mixed with a modulation signal of a fixed frequency, the modulation signal being selectively phased delayed for each electrical signal in the group depending on the angle of direction of a reflection point in an imaged volume. The mixed electrical signals for each group are then summed and selectively timed delayed, and then all time delayed and summed electrical signals are then summed to form an image beam.

10 Claims, 4 Drawing Figures

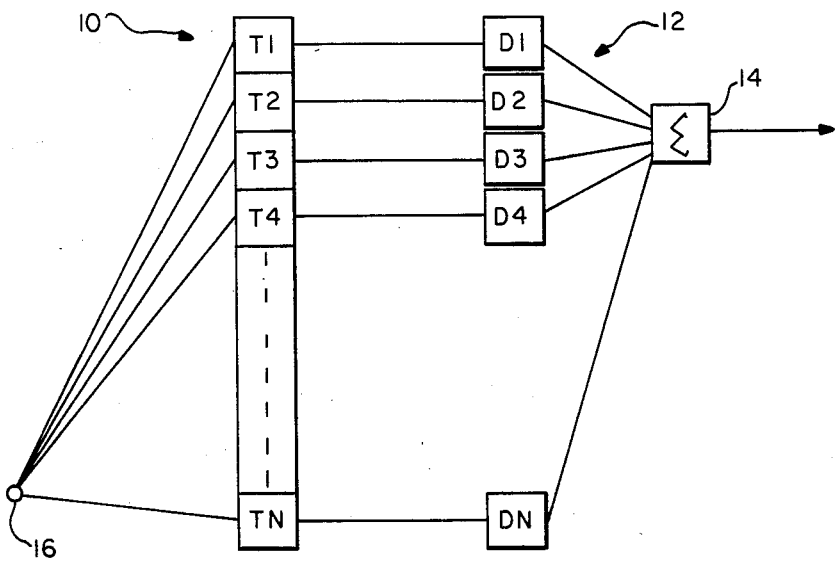
PRIOR ART
FIG. —1
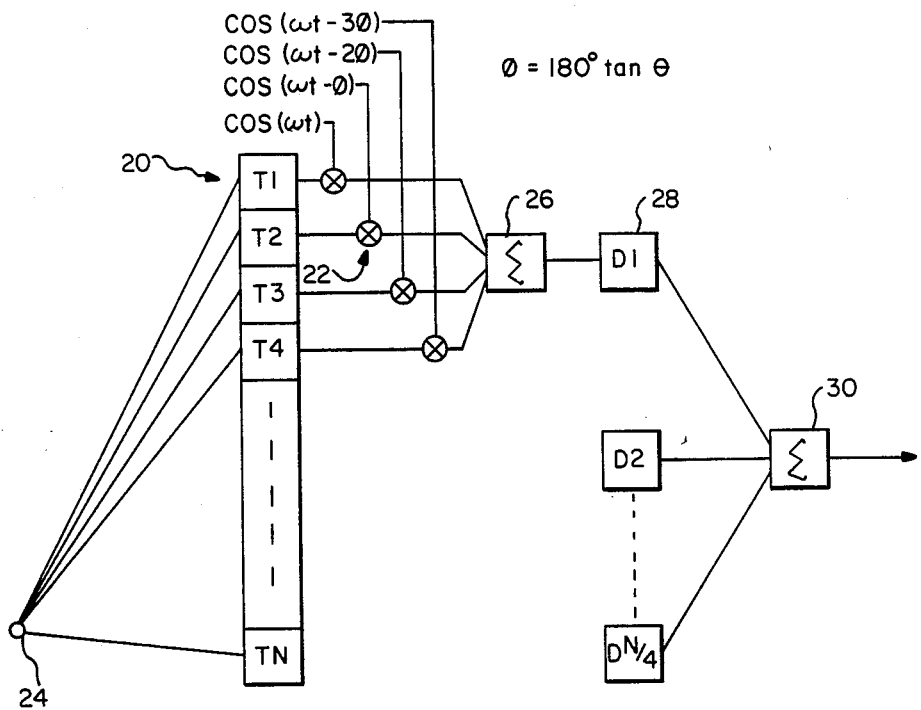
FIG. —2

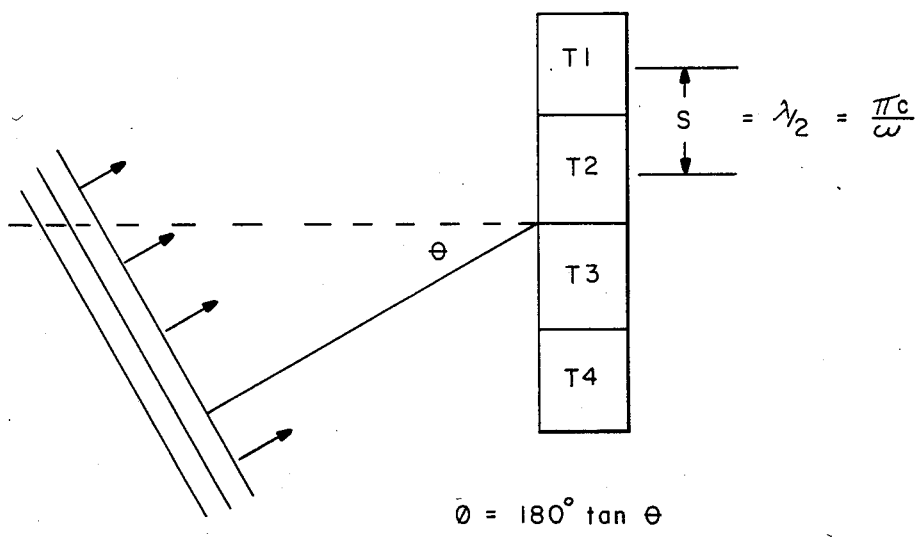
FIG.—3
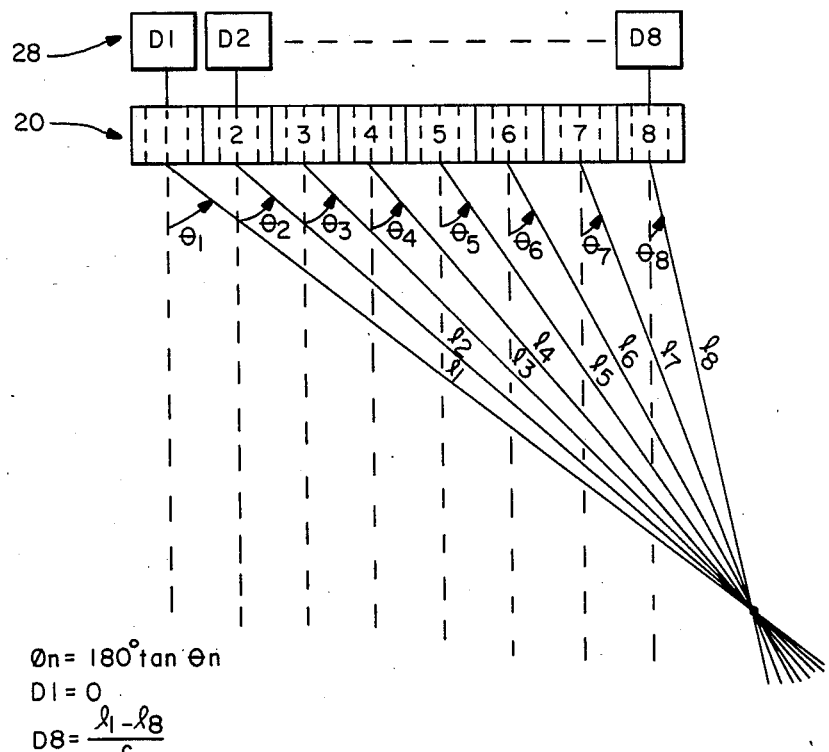
FIG.—4

METHOD AND MEANS FOR STEERING PHASED ARRAY SCANNER IN ULTRASOUND IMAGING SYSTEM

This invention relates generally to ultrasound imaging systems using phased array scanners, and more particularly the invention relates to the steering of a phased array in scanning an object to be imaged.

The phased array scanner comprises a linear array of transducer elements which transmit ultrasonic waves and receive reflections thereof from objects to be imaged. The steering or directivity of the array in receiving reflections from points in the viewing field is accomplished by time delaying signals generated by each transducer element to compensate for the different distances of the point to each transducer element. As discussed in U.S. Pat. No. 4,387,597, attempts have been made to provide "fine" delay by phase shifting along with a "coarse" delay by a delay line connected to each transducer element. The patent proposes to eliminate all fine delay lines by utilizing a matched filter technique wherein each received electrical signal is correlated with a reference signal whose frequency, phase, time duration and time occurrence are related in a predetermined manner to the corresponding characteristics that the received electrical signal has for returns from object points within each of a plurality of distant incremental portions of the object, referred to as "range cells". The amplified signals from the transducer elements are applied to a corresponding one of a plurality of mixers to whose second input is applied one of a corresponding plurality of binary reference signals. The output from each mixer is integrated, and then the plurality of integrated signals are summed.

The present invention is directed to steering a phased array of transducer elements by grouping the elements, selectively phase shifting the electrical signals in each group of elements, and then summing the phase shifted signals of each group. The summed signals of each group are then time delayed, and finally the time delayed signals are summed. The number of delay lines is reduced by a factor equal to the number of transducers in each group. The invention is particularly applicable to a baseband system and an intermediate frequency system where the incoming frequency of the reflected ultrasonic waves is translated to a lower frequency for signal processing.

Accordingly, an object of the invention is an improved method and apparatus for steering a phased array of transducer elements in an ultrasound scanning system.

A feature of the invention is the phased shifting of signals from groups of transducer elements, summing the phase shifted signals, and then time delaying the summed signals.

The invention and objects and features thereof will be more readily apparent from the following detailed description and appended claims when taken with the drawing, in which:

FIG. 1 is a functional block diagram of a phased array of transducer elements in accordance with the prior art.

FIG. 2 is a functional block diagram of a phased array of transducer elements in accordance with the present invention.

FIG. 3 is a functional block diagram of one group of transducer elements receiving a reflected wave.

FIG. 4 is a functional block diagram of a phased array of transducer elements in accordance with the invention and illustrating different path lengths of a reflected ultrasonic wave.

Referring now to the drawings, FIG. 1 is a functional block diagram of a phased array of transducer elements shown generally at 10 in which electrical signals from each transducer element are passed through a delay line as shown generally at 12 and then summed at 14. For example, in receiving a reflected wave from a point 16 in the viewing field, a wave received by the element $T_N$ must be delayed relative to the signal generated by transducer element $T_1$ at the opposite end of the array due to the shorter reflection path from the point 16 to element $T_N$ as opposed to the longer distance from the point 16 to the element $T_1$. Such a system is described in U.S. Pat. No. 4,387,597, supra. As there described, such scanners have been difficult and costly to implement because of the many delay lines required.

FIG. 2 is a functional block diagram of a phased array of transducer elements and circuitry for steering the transducer elements in accordance with an embodiment of the present invention. The transducer elements are grouped with a plurality of adjacent transducer elements in each group, such as the four transducer elements $T_1$ through $T_4$. The electrical signals generated by each transducer element in the group are applied to mixers 22 where the signals are mixed with a signal, $\omega t$, which is selectively delayed in phase to compensate for differences in path length of the reflected wave from a point 24 to each of the transducer elements. The coherent outputs from the mixers 22 are then summed at 26 and then applied through a delay line 28. Similarly, the other groups of transducer elements in the array 20 are frequency modulated with selective phase delay, summed, and then applied through other delay lines before a final summing of the delayed signals at 30. It will be noted that the number of delay lines 28 is a fraction of the total number of transducer elements, depending on the number of transducer elements in each group, as opposed to the equal number of delay elements from the transducer elements in the system of FIG. 1.

The phase delay, $\phi$, employed with the mixers in FIG. 2 is a function of the angle of inclination, $\theta$, of the incoming wave relative to the perpendicular to the transducer elements, as illustrated in FIG. 3. Assuming that the spacing, s, of the transducer elements is one-half wavelength, $\lambda/2$, which is equal to $(\pi c/\omega)\phi = 180°$ tan $\theta$, where c is the speed of sound in the imaged medium, then $\phi = 180°$ tan $\theta$. A more general equation is given as follows:

$$\phi_n = (2\pi/\lambda)[R_{max} - [R^2 - 2R(n\lambda/2) \cos(90 - \theta) + (n\lambda/2)^2]^{\frac{1}{2}}]$$

where $R_{max}$ is the maximum distance of a transducer array group from a reflection point and R is the average distance of a group of transducers from the reflection point.

FIG. 4 is a functional block diagram of the array of transducer elements and illustrates the amount of time delay required by the delay lines 28 in FIG. 2. The lengths, l, are shown from a focal point to the middle of each group of transducer elements and the angle, $\theta$, associated therewith. Since the length $l_1$, is the longest pathlength for a reflected wave, the time delay of D1 is zero. Conversely, the shortest path length is $L_8$ and consequently the delay of delay line D8 is the greatest and is given as follows:

$$D8 = (l_1 - l_8)/c$$

where c is the speed of sound in the medium being imaged.

There has been described a new and improved apparatus for steering a phased array of transducer elements in an ultrasound imaging system. The apparatus is particularly useful in baseband and intermediate frequency systems which utilize frequency mixers for changing the frequencies of the reflected ultrasonic waves for subsequent processing. While the invention has been described with reference to a specific embodiment, the description is illustrative of the invention and is not to be construed as limiting the invention. For example, warping of the phase shift distribution can be used to accommodate an arriving spherical wave. Thus, various modifications and applications may occur to those skilled in the art without departing from the true spirit and scope of the invention as defined by the appended claims.

What is claimed is:

1. A method of selectively directing a phased array of transducer elements in an ultrasound imaging system comprising the steps of
    grouping transducer elements to form a plurality of groups of adjacent transducer elements,
    mixing each electrical signal from each group with a modulation signal of a fixed frequency, each modulation signal being selectively phase delayed for each electrical signal in each group depending on the angle of direction of a reflection point in an imaged volume,
    summing the mixed electrical signals for each group,
    selectively time delaying the summed electrical signals for all group, and
    summing the selectively time delayed and summed electrical signals.

2. The method as defined in claim 1 wherein the spacing of adjacent transducer elements is one-half wavelength of a transmitted ultrasound wave, $\theta$ is the angle of a reflection point in an imaged volume, and $\phi$ is a unit of phased delay for adjacent transducer elements in a group, and $\phi = 180° \tan \theta$.

3. The method as defined by claim 1 wherein the frequency of the modulation signals is selected for developing an intermediate frequency for signal processing.

4. The method as defined by claim 1 wherein the frequency of the modulation signals is selected for developing a baseband signal for signal processing.

5. The method as defined in claim 1 wherein the selective time delay for signals in each group is determined by the difference in the longest reflection path to a group from a reflection point and the reflection path to each group from the reflection point.

6. Apparatus for selectively directing a phased array of transducer elements in an ultrasound imaging system comprising
    a plurality of groups of adjacent transducer elements,
    means for mixing each electrical signal from each group of transducers with a modulation signal of a fixed frequency, each modulation signal being selectively phase delayed for each electrical signal in the group depending on the angle of direction of a reflection point in an imaged volume,
    means for summing the mixed electrical signals for each group, means for selectively time delaying the summed electro signals for all groups, and means for summing the selectively time delayed and summed electrical signals.

7. Apparatus as defined by claim 6 wherein the spacing of adjacent transducer elements is one-half wavelength of a transmitted ultrasound wave, $\theta$ is the angle of a reflection point in the imaged volume, and $\phi$ is the unit of phase delay for adjacent transducer elements in a group, wherein $\phi = 180° \tan \theta$.

8. Apparatus as defined in claim 1 wherein said means for mixing each electrical signal develops an intermediate frequency for subsequent signal processing.

9. Apparatus as defined by claim 1 wherein said means for mixing said electrical signals develops a baseband signal for subsequent processing.

10. Apparatus as defined by claim 6 wherein the selective time delay for said time delay means is determined by the difference in the longest reflection path from a reflection point to a group and the reflection path to each specific group.

* * * * *